United States Patent Office 3,117,600
Patented Jan. 14, 1964

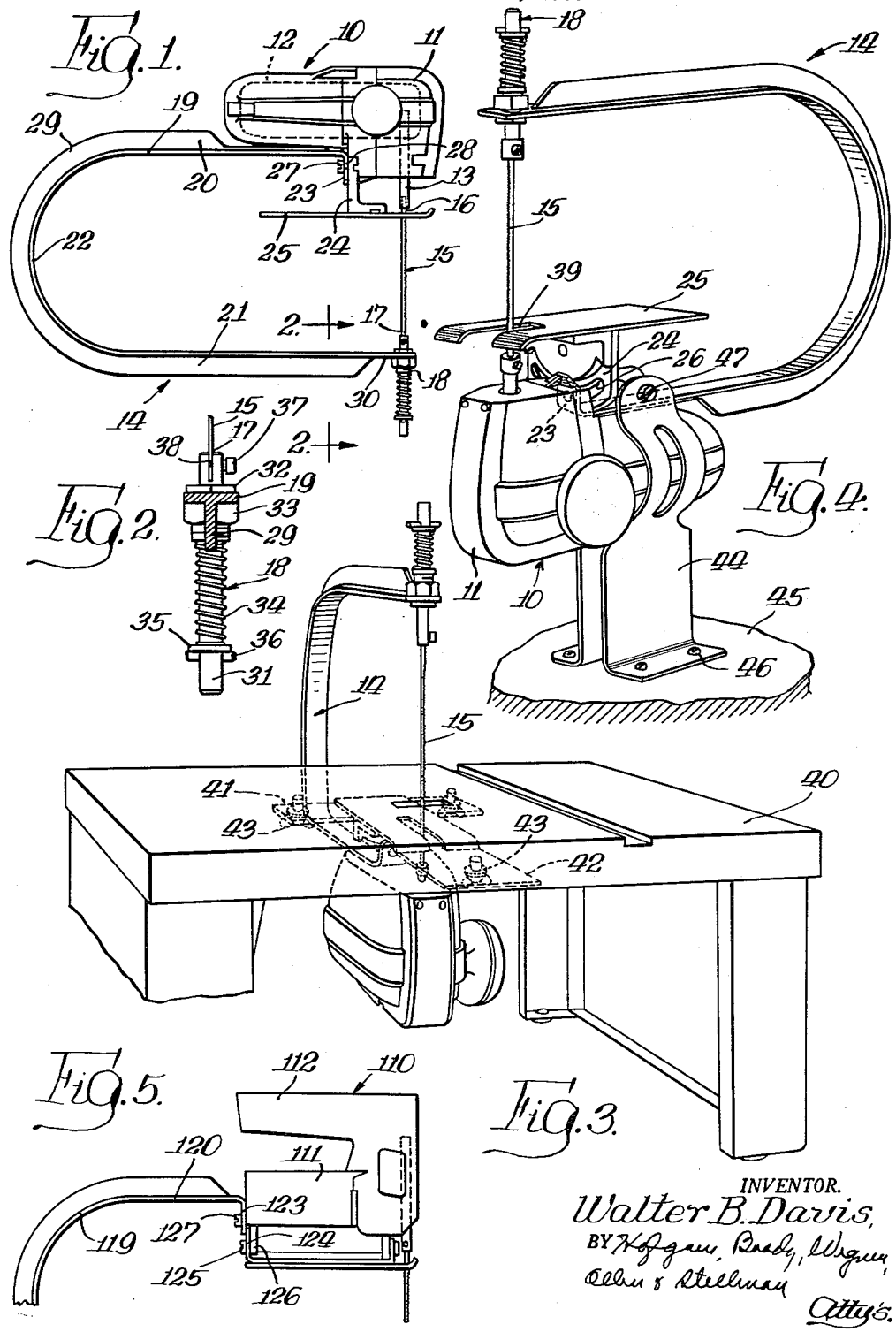

3,117,600
SCROLL SAW ATTACHMENT FOR SABRE SAW
Walter B. Davis, Hinsdale, Ill., assignor to Portable Electric Tools, Inc., a corporation of Illinois
Filed Oct. 6, 1960, Ser. No. 61,022
2 Claims. (Cl. 143—70)

This invention relates to hand saws and in particular to a hand saw selectively convertible to a jigsaw and a scroll saw.

In the conventional jig or sabre type hand saw, a relatively rigid saw blade is secured at one end to a rectilinearly reciprocated element of the saw. As the distal end of the saw blade is unsupported, such a jig or sabre saw is extremely useful where free access to the work must be had at the distal end of the blade, such as in starting a hole in the work on plunge cuts.

Where relatively fine cuts are desired, however, it is necessary to utilize a coping saw blade which by virtue of its extremely small size can not be operated with the distal end thereof unsupported. Heretofore, no satisfactory means have been available for utilizing a coping saw blade in conjunction with the operating mechanism of a hand saw of the jigsaw type. The present invention comprehends a new and improved structure filling this long felt need.

A principal object of the present invention, therefore, is to provide a new and improved hand saw structure.

Another object is to provide such a hand saw structure permitting facilitated selective convertibility of the hand saw to a jigsaw and a scroll saw.

A further object of the invention is to provide such a hand saw structure wherein the conventional elements of the jigsaw are utilized in a new and improved manner when the hand saw is arranged as a scroll saw.

Still another object of the invention is to provide such a hand saw structure including a housing, means on the housing for grasping by the user to manipulate the saw during use, a reciprocating drive in the housing, a connector rectilinearly reciprocated by the drive, the connector being accessible from without the housing for connection thereto of one end of an elongate saw blade, a support provided with first and second leg portions, means removably securing the first leg portion to the housing to position the second leg portion outwardly from the connector on the line of reciprocation thereof at a distance from the connector approximately equal to the length of the saw blade, and means for movably carrying the other end of the saw blade at the second leg portion.

Yet another object of the invention is to provide a new and improved means for converting a conventional hand saw of the jigsaw type to a scroll saw.

A yet further object is to provide such a converting means including a U-shaped support provided with substantially parallel first and second leg portions and an intermediate bight portion, the first leg portion including a turned end, means removably securing the turned end of the first leg portion to the housing of the hand saw to position the distal end of the second leg portion outwardly from the rectilinearly reciprocated connector of the hand saw on the line of reciprocation thereof, and means for movably carrying the other end of the saw blade at the distal end of the second leg portion.

Other features and advantages of the invention will be apparent from the following description taken in connection with the accompanying drawing wherein:

FIG. 1 is a side elevation of a hand saw embodying the invention;

FIG. 2 is an enlarged fragmentary vertical section taken substantially along the line 2—2 of FIG. 1;

FIG. 3 is a fragmentary perspective view of the hand saw removably secured to a worktable;

FIG. 4 is a perspective view of the hand saw secured to a support to utilize the shoe thereof as a worktable; and FIG. 5 is a fragmentary side elevation of a modified form of hand saw embodying the invention.

In the exemplary embodiment of the invention as disclosed in FIGS. 1–4 of the drawing, a hand saw generally designated 10 is shown to comprise a housing 11 enclosing a reciprocating drive 12. Such reciprocating drives are well-known to those skilled in the art and require no further elaboration herein. Rectilinearly reciprocated by the drive 12 is a connector 13 which extends to without the housing 11 for connection thereto of one end of an elongate saw blade. The saw blade may comprise a conventional jig or sabre saw blade (not shown). The present invention comprehends the provision in the saw 10 of means generally designated 14 for supporting the distal end of an elongate saw blade connected to connector 13; as shown in FIG. 1, such a saw blade may comprise a coping saw blade 15 having one end 16 secured to connector 13 and its distal end 17 secured to an outboard support device 18 of supporting means 14.

More specifically, supporting means 14 comprises a U-shaped member 19 defined by a first leg portion 20, a second leg portion 21 extending substantially parallel to the first leg portion 20, and an arcuate bight portion 22. The distal end 23 of first leg portion 20 is turned inwardly, or toward leg portion 21, to have facial engagement with the carrier 24 of the shoe 25 of the saw 10. As best seen in FIG. 4, carrier 24 is provided with an arcuate slot 26 through which a screw 27 passes to have threaded engagement with the housing 11 for adjustably locking the shoe 25 in any of a plurality of angular positions about an axis parallel to the axis of screw 27. The turned end 23 of the support 19 is provided with a hole 28 through which the screw 27 extends, whereby the turned end 23 is effectively secured to the housing 11 by the screw 27.

For increased rigidity of the support 19, the support is provided with an outwardly extending rib 29 which terminates short of the housing 11 to preclude interference with the housing adjacent turned end 28, and which terminates short of the distal end 30 of leg portion 21 for facilitated installation of outboard support device 18 thereon. Resultingly, as best seen in FIG. 2, the support 19 is generally T-shaped transversely to the elongate extent thereof.

Referring now more specifically to FIG. 2, the outboard support device 18 is shown to be of conventional construction including a shaft 31 axially slidable in a bearing 32 carried on support 19 and secured thereto by means of a hex nut 33. A compression coil spring 34 concentrically on shaft 31 urges a washer 35 against a roll pin 36 secured to the shaft to bias the shaft 31 to the position shown in FIG. 2. A screw 37 extends through the other end of the shaft 31 to engage the saw blade end 17 received in a suitable slot 38 in the end of the shaft 31 for securing the saw blade end 17 to the outboard support 18.

Thus, when it is desired to use the hand saw 10 as a scroll saw, the support means 14 is installed merely by firstly removing screw 27, placing the support turned end 23 in facial engagement with the carrier 24 of the saw shoe 25 and reinstalling screw 27 to secure the support means 14 and saw shoe to the saw housing 11. A suitable saw blade 15 is then secured at its opposite ends to connector 13 and device 18, the saw blade extending through a suitable slot 39 in the shoe 25, as best seen in FIG. 4. Operation of the drive 12 of the hand saw 10 now effects a linear reciprocation of the saw blade 15 providing facilitated use of the hand saw 10 as a scroll saw.

As best shown in FIG. 3, hand saw 10, when thusly arranged as a scroll saw, may be mounted on a conventional sabre saw table 40 by suitable clamp bars 41 and 42 and co-operating wing bolts 43. Alternatively, as shown in FIG. 4, the hand saw 10 may be utilized with shoe 25 comprising effectively a work supporting table. Thusly, a suitable stand 44 may be secured to the housing 11 by suitable means such as bolt 45 to arrange the saw 10 with the shoe 25 disposed uppermost. The stand 44 may be secured to a suitable suport 45 by means such as screws 46 whereby the shoe 25 may function to carry the work slidably during the cutting thereof by the saw blade 15. It should be noted that as the shoe 25 is readily angularly adjustable relative to the direction of elongate extent of the saw blade 15, angular cutting of the work carried on the shoe 25 is readily effected.

Turning now to FIG. 5, a modified form of hand saw generally designated 110 is shown to comprise a modified housing 111 provided with a projecting handle 112. The shoe carrier 124 is secured by a suitable screw 125 to one end 126 of the housing 111. Leg portion 120 of the support 119 is somewhat shorter than leg portion 20 of support 19 of saw 10 to have the turned end 123 thereof secured to the housing end 126 by a separate screw 127. In all other respects, the structure of saw 110 is similar to the structure of saw 10 and functions in a similar manner.

Thus, each of support means 19 and 119 provides a facilitated arrangement of the hand saw for use as a coping saw wherein the outboard end of the relatively thin saw blade is suitably supported. The supporting means is arranged for ready installation and removal relative to the saw housing so that the saw may be selectively readily utilized as a conventional jig or sabre saw or as a scroll saw as desired.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. A hand saw comprising: an elongated housing; means on the housing arranged for facilitated grasping by the user to manipulate the saw during use; a reciprocating drive in said housing; a connector rectilinearly reciprocated by said drive, said connector being adjacent one end of the housing and arranged accessible from without the housing for connection thereto of one end of an elongate saw blade; a shoe device carried by the housing for sliding engagement with work to be cut by the saw blade; a support provided with first and second leg portions; means securing said first leg portion to said housing to extend from the other end of the housing and being arranged to position said second leg portion outwardly from the connector on the line of reciprocation thereof, said securing means including a screw extending through the shoe device and engaging said housing for adjustably securing the shoe device to the housing, said screw further extending through said first leg portion to secure said first leg portion to the shoe device; and means for movably carrying the other end of the saw blade at said second leg portion.

2. The hand saw of claim 1 wherein each of said leg portions of the support is provided with a flat distal end, and the intermediate portion of the support between the distal ends is provided with an outwardly extending rib.

References Cited in the file of this patent

UNITED STATES PATENTS

| | | |
|---|---|---|
| 2,333,372 | Green | Nov. 2, 1943 |
| 2,611,400 | Shore | Sept. 23, 1952 |
| 2,652,863 | Grabinski | Sept. 22, 1953 |
| 2,656,861 | Verret | Oct. 27, 1953 |
| 2,780,248 | Andreae | Feb. 5, 1957 |
| 2,906,304 | Levine | Sept. 29, 1959 |

FOREIGN PATENTS

| | | |
|---|---|---|
| 484,653 | Great Britain | May 9, 1938 |